United States Patent
Akatsuka et al.

(10) Patent No.: US 12,097,916 B2
(45) Date of Patent: Sep. 24, 2024

(54) VEHICLE CONTROL SYSTEM AND VEHICLE CONTROL METHOD

(71) Applicants: TOYOTA JIDOSHA KABUSHIKI KAISHA, Toyota (JP); JTEKT CORPORATION, Kariya (JP)

(72) Inventors: Kosuke Akatsuka, Mishima (JP); Yoshio Kudo, Machida (JP); Koji Anraku, Okazaki (JP)

(73) Assignees: TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 201 days.

(21) Appl. No.: 17/732,956

(22) Filed: Apr. 29, 2022

(65) Prior Publication Data

US 2022/0410967 A1 Dec. 29, 2022

(30) Foreign Application Priority Data

Jun. 28, 2021 (JP) ................................ 2021-106871

(51) Int. Cl.
  *B62D 6/00* (2006.01)
  *B62D 5/04* (2006.01)

(52) U.S. Cl.
  CPC .......... *B62D 6/008* (2013.01); *B62D 5/0481* (2013.01)

(58) Field of Classification Search
  CPC .............. B62D 15/0205; B62D 15/025; B62D 15/0265; B62D 5/001; B62D 5/0481; B62D 6/002; B62D 6/008
  See application file for complete search history.

(56) References Cited

U.S. PATENT DOCUMENTS

| | | | | |
|---|---|---|---|---|
| 6,082,482 A | * | 7/2000 | Kato | B62D 6/008 701/41 |
| 6,308,122 B1 | * | 10/2001 | Nishizaki | B62D 6/003 701/41 |
| 9,561,822 B2 | * | 2/2017 | Taniguchi | B62D 6/008 |
| 10,829,153 B1 | * | 11/2020 | Taniguchi | B62D 15/021 |
| 11,292,510 B2 | * | 4/2022 | Anraku | B62D 6/04 |
| 11,358,629 B2 | * | 6/2022 | Kim | G05D 1/0223 |
| 11,745,731 B2 | * | 9/2023 | Harai | B60L 3/12 701/41 |
| 11,801,866 B2 | * | 10/2023 | Kim | B60W 60/0011 |

(Continued)

FOREIGN PATENT DOCUMENTS

| | | |
|---|---|---|
| EP | 3 608 190 A1 | 2/2020 |
| JP | 5994868 B2 | 9/2016 |

(Continued)

*Primary Examiner* — Carl C Staubach
(74) *Attorney, Agent, or Firm* — Sughrue Mion, PLLC

(57) ABSTRACT

A vehicle control system controls a vehicle of a steer-by-wire type. The vehicle control system is configured to execute: driving assist control that assists driving of the vehicle; and conjunction reaction force control that applies a steering reaction force component to a steering wheel in conjunction with turning of the vehicle caused by the driving assist control. A driving assist direction is a direction of the turning of the vehicle caused by the driving assist control. The conjunction reaction force control includes feedforward reaction force control that moves the steering wheel in a same direction as the driving assist direction without depending on a steering angle of the steering wheel.

9 Claims, 11 Drawing Sheets

(56) References Cited

U.S. PATENT DOCUMENTS

| | | | | |
|---|---|---|---|---|
| 2005/0045413 | A1* | 3/2005 | Shitamitsu | B62D 5/0409 180/402 |
| 2006/0200289 | A1* | 9/2006 | Chino | B62D 6/008 701/41 |
| 2008/0251312 | A1* | 10/2008 | Goto | B62D 6/003 180/446 |
| 2009/0024281 | A1* | 1/2009 | Hwang | B62D 6/008 701/41 |
| 2009/0312909 | A1* | 12/2009 | Onuma | B62D 6/008 701/41 |
| 2016/0355212 | A1* | 12/2016 | Takaso | B62D 1/28 |
| 2017/0036694 | A1* | 2/2017 | Okuda | B62D 6/02 |
| 2018/0086341 | A1* | 3/2018 | Taniguchi | B62D 6/008 |
| 2018/0273026 | A1* | 9/2018 | Oyama | B60W 30/18145 |
| 2019/0233000 | A1 | 8/2019 | Matsuda et al. | |
| 2020/0047749 | A1* | 2/2020 | Morotomi | B60W 30/09 |
| 2020/0108857 | A1* | 4/2020 | Tsubaki | B62D 5/04 |
| 2020/0377152 | A1* | 12/2020 | Taniguchi | B62D 5/046 |
| 2021/0016827 | A1* | 1/2021 | Suzuki | B62D 5/0481 |
| 2021/0284226 | A1* | 9/2021 | Kodera | B62D 6/00 |
| 2021/0354748 | A1* | 11/2021 | Kunihiro | B62D 6/007 |
| 2022/0135031 | A1* | 5/2022 | Oniwa | B62D 15/025 701/41 |
| 2022/0135129 | A1* | 5/2022 | Oniwa | B62D 15/025 701/41 |
| 2022/0242481 | A1* | 8/2022 | Mizoguchi | B62D 15/025 |
| 2022/0332367 | A1* | 10/2022 | Akatsuka | B62D 15/025 |
| 2022/0410967 | A1* | 12/2022 | Akatsuka | B62D 6/002 |
| 2022/0410968 | A1* | 12/2022 | Akatsuka | B62D 5/0481 |

FOREIGN PATENT DOCUMENTS

| | | |
|---|---|---|
| JP | 2019-127237 A | 8/2019 |
| WO | 2019/116453 A1 | 6/2019 |

* cited by examiner

VEHICLE CONTROL SYSTEM AND VEHICLE CONTROL METHOD

CROSS-REFERENCE TO RELATED APPLICATION

The present disclosure claims priority to Japanese Patent Application No. 2021-106871, filed on Jun. 28, 2021, the contents of which application are incorporated herein by reference in there entirety.

BACKGROUND

Technical Field

The present disclosure relates to a technique of controlling a vehicle of a steer-by-wire (SBW) type. In particular, the present disclosure relates to a technique of controlling a vehicle of a steer-by-wire type having a function of driving assist control for assisting driving of the vehicle.

Background Art

Patent Literature 1 discloses a steering control device of a vehicle of a steer-by-wire type. The steering control device calculates a steering reaction force based on a feedback axial force and a feedforward axial force, and applies the steering reaction force to a steering wheel. The feedback axial force, which corresponds to a road surface reaction force, is calculated based on a turning current in a turning actuator that performs turning according to an operation amount of the steering wheel. On the other hand, the feedforward axial force, which corresponds to a damping component and the like, is calculated based on a steering angle of the steering wheel. When lane keep assist for preventing lane departure of the vehicle is in operation, the steering reaction force is calculated based on the feedforward axial force without using the feedback axial force.

LIST OF RELATED ART

Patent Literature 1: Japanese Patent No. 5994868

SUMMARY

A case where a vehicle of a steer-by-wire type has a function of driving assist control that assists driving of the vehicle is considered. For example, the driving assist control automatically turns (steers) the vehicle independently of a steering operation by a driver. In that case, the driver may have a feeling of strangeness about an unintended vehicle behavior.

An object of the present disclosure is to provide a technique that can transmit a direction of vehicle turning caused by the driving assist control to the driver, in the vehicle of the steer-by-wire type.

A first aspect is directed to a vehicle control system that controls a vehicle of a steer-by-wire type.

The vehicle control system includes one or more processors.

The one or more processors are configured to execute:
  driving assist control that assists driving of the vehicle; and
  conjunction reaction force control that applies a steering reaction force component to a steering wheel in conjunction with turning of the vehicle caused by the driving assist control.

A driving assist direction is a direction of the turning of the vehicle caused by the driving assist control.

The conjunction reaction force control includes feedforward reaction force control that moves the steering wheel in a same direction as the driving assist direction without depending on a steering angle of the steering wheel.

A second aspect is directed to a vehicle control method that controls a vehicle of a steer-by-wire type.

The vehicle control method includes:
  driving assist control that assists driving of the vehicle; and
  conjunction reaction force control that applies a steering reaction force component to a steering wheel in conjunction with turning of the vehicle caused by the driving assist control.

A driving assist direction is a direction of the turning of the vehicle caused by the driving assist control.

The conjunction reaction force control includes feedforward reaction force control that moves the steering wheel in a same direction as the driving assist direction without depending on a steering angle of the steering wheel.

According to the present disclosure, the conjunction reaction force control that applies the steering reaction force component to the steering wheel in conjunction with the vehicle turning caused by the driving assist control is performed. The conjunction reaction force control includes the feedforward reaction force control that moves the steering wheel in the same direction as the driving assist direction (i.e., the direction of the vehicle turning caused by the driving assist control) without depending on the steering angle of the steering wheel. The feedforward reaction force control makes it possible to effectively transmit the driving assist direction to the driver. As a result, the driver's feeling of strangeness is reduced.

EMBODIMENTS

Embodiments of the present disclosure will be described below with reference to the attached drawings.

1. Vehicle Control System

Figure 1:
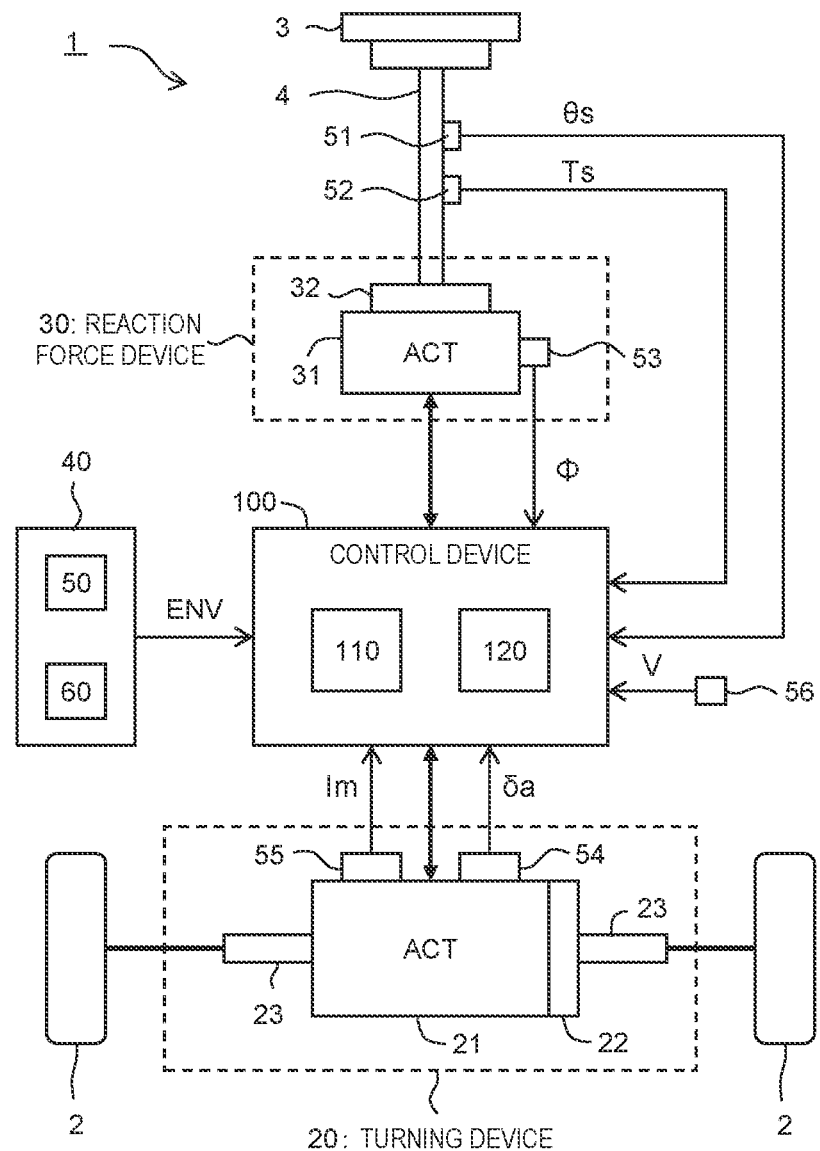
FIG. 1 is a schematic diagram showing a configuration example of a vehicle and a vehicle control system according to an embodiment.

FIG. 1 is a schematic diagram showing a configuration example of a vehicle 1 and a vehicle control system 10 according to the present embodiment. The vehicle 1 is provided with a wheel 2 and a steering wheel 3. The steering wheel 3 is an operation member that a driver of the vehicle 1 uses for a steering operation. A steering shaft 4 is coupled with the steering wheel 3 and rotates together with the steering wheel 3. The vehicle 1 is a vehicle of a steer-by-wire type, and the wheel 2 and the steering wheel 3 are mechanically disconnected from each other.

The vehicle control system 10 controls the vehicle 1 of the steer-by-wire type. The vehicle control system 10 includes a turning device 20, a reaction force device 30, a driving environment information acquisition device 40, and a control device 100.

The turning device 20 turns the wheel 2. Here, turning the wheel 2 means changing a direction of the wheel 2 for making a turn. The turning device 20 includes a turning actuator 21 for turning the wheel 2. For example, the turning actuator 21 is a turning motor. A rotor or the turning motor is connected to a turning bar 23 through a speed reducer 22. The turning bar 23 is coupled with the wheel 2. When the turning motor rotates, its rotational motion is converted into a linear motion of the turning bar 23, and thereby the wheel 2 turns (i.e. changes its direction). That is, actuating the turning motor makes it possible to turn the wheel 2. The operation of the turning actuator 21 is controlled by the control device 100.

The reaction force device 30 applies a steering reaction force (reaction torque) to the steering wheel 3. The reaction force device 30 includes a reaction force actuator 31 for applying the steering reaction force to the steering wheel 3. For example, the reaction force actuator 31 is a reaction force motor. Actuating the reaction force motor makes it possible to apply the steering reaction force to the steering shaft 4 and thus to the steering wheel 3. The operation of the reaction force actuator 31 is controlled by the control device 100.

The driving environment information acquisition device 40 acquires driving environment information ENV indicating a driving environment for the vehicle 1. The driving environment information acquisition device 40 includes a vehicle state sensor 50, a recognition sensor 60, and the like.

The vehicle state sensor 50 detects a state of the vehicle 1. The vehicle state sensor 50 includes a steering angle sensor 51, a steering torque sensor 52, a rotational angle sensor 53, a rotational angle sensor 54, a turning current sensor 55, a vehicle speed sensor 56, and the like. The steering angle sensor 51 detects a steering angle θs (i.e., a steering wheel angle) of the steering wheel 3. The steering torque sensor 52 detects a steering torque Ts applied to the steering shaft 4. The rotational angle sensor 53 detects a rotation angle Φ of the reaction force actuator 31 (e.g., the reaction force motor). The rotational angle sensor 54 detects a rotation angle of the turning actuator 21 (e.g., the turning motor). The rotation angle of the turning motor corresponds to a turn angle (i.e., an actual turn angle δa) of the wheel 2. It can be also said that the rotational angle sensor 54 detects the actual turn angle δa of the wheel 2. The turning current sensor 55 detects a turning current Im that drives the turning actuator 21. The vehicle speed sensor 56 detects a vehicle speed V being a speed of the vehicle 1. In addition, the vehicle state sensor 50 may include a yaw rate sensor and an acceleration sensor.

The recognition sensor 60 recognizes (detects) a situation around the vehicle 1. Examples of the recognition sensor 60 include a camera, a LIDAR (Laser Imaging Detection and Ranging), a radar, and the like.

The driving environment information acquisition device 40 may further include a position sensor that acquires a position of the vehicle 1. The position sensor is exemplified by a GPS (Global Positioning System) sensor. The driving environment information acquisition device 40 may acquire map information.

The driving environment information ENV includes vehicle state information and surrounding situation information. The vehicle state information indicates the vehicle state detected by the vehicle state sensor 50. The surrounding situation information indicates results of recognition by the recognition sensor 60. For example, the surrounding situation information includes an image captured by the camera. The surrounding situation information may include object information about objects around the vehicle 1. Examples of the objects around the vehicle 1 include a pedestrian, another vehicle (e.g., a preceding vehicle, a parked vehicle, etc.), a sign, a white line, a roadside structure, and the like. The object information indicates a relative position and a relative velocity of the object with respect to the vehicle 1. The driving environment information ENV may further include the position information of the vehicle 1, the map information, and the like.

The control device (controller) 100 controls the vehicle 1. The control device 100 includes one or more processors 110 (hereinafter simply referred to as a processor 110) and one or more memory devices 120 (hereinafter simply referred to as a memory devices 120). The processor 110 executes a variety of processing. For example, the processor 110 includes a CPU (Central Processing Unit). The memory device (memory) 120 stores a variety of information necessary for the processing by the processor 110. Examples of the memory device 120 include a volatile memory, a nonvolatile memory, an HDD (Hard Disk Drive), an SSD (Solid State Drive), and the like. The control device 100 may include one or more ECUs (Electronic Control Units).

The variety of processing by the control device 100 is implemented by the processor 110 executing a control program being a computer program. The control program is stored in the memory device 120. As another example, the control program may be recorded on a non-transitory computer-readable recording medium.

The control device 100 (i.e., the processor 110) acquires the driving environment information ENV from the driving environment information acquisition device 40. The driving environment information ENV is stored in the memory device 120.

Figure 2:
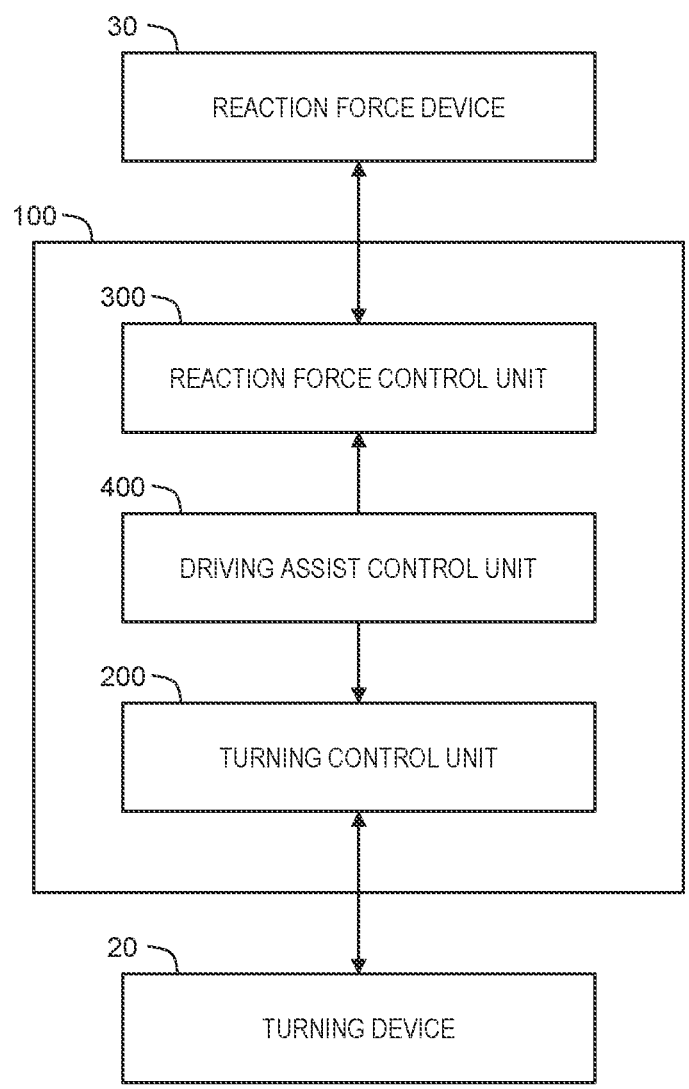
FIG. 2 is a block diagram showing a functional configuration of a control device of a vehicle control system according to an embodiment.

FIG. 2 is a block diagram showing a functional configuration of the control device 100. The control device 100 includes a turning control unit 200, a reaction force control unit 300, and a driving assist control unit 400 as functional blocks. These functional blocks are realized by a cooperation of the processor 110 executing the control program and the memory device 120. It should be noted that the turning control unit 200, the reaction force control unit 300, and the driving assist control unit 400 may be realized by different control devices, respectively. In that case, the control devices are communicably connected to each other and communicate necessary information with each other.

Hereinafter, each of the turning control unit 200, the reaction force control unit 300, and the driving assist control unit 400 will be described in more detail.

2. Turning Control

The turning control unit 200 executes "turning control" that turns the wheel 2. More specifically, the turning control unit 200 turns (i.e., changes a direction of) the wheel 2 by controlling the turning actuator 21 of the turning device 20.

The turning control unit 200 executes the turning control in response to a steering operation of the steering wheel 3 performed by the driver. For example, the turning control unit 200 calculates a target turn angle δt based on the steering angle θs and the vehicle speed V. The steering angle θs is detected by the steering angle sensor 51. As another example, the steering angle θs may be calculated from the rotation angle Φ detected by the rotational angle sensor 53. The vehicle speed V is detected by the vehicle speed sensor 56. The turning control unit 200 turns the wheel 2 according to the target turn angle δt. The actual turn angle δa of the wheel 2 is detected by the rotational angle sensor 54. The turning control unit 200 controls the turning actuator 21 such that the actual turn angle δa follows the target turn angle δt. More specifically, the turning control unit 200 generates a control signal for driving the turning actuator 21 based on a deviation between the target turn angle δt and the actual turn angle δa of the wheel 2. The turning actuator 21 is driven according to the control signal, and thereby the wheel 2 is turned. It should be noted a current driving the turning actuator 21 at this time is the turning current Im.

Moreover, the turning control unit 200 executes the turning control according to a request from the driving assist control unit 400 described later. In this case, the turning control unit 200 acquires a target control amount from the driving assist control unit 400 and executes the turning control according to the target control amount.

3. Reaction Force Control

The reaction force control unit 300 executes "reaction force control" that applies the steering reaction force (reaction torque) to the steering wheel 3. More specifically, the reaction force control unit 300 applies the steering reaction force to the steering wheel 3 by controlling the reaction force actuator 31 of the reaction force device 30.

The reaction force control unit 300 executes the reaction force control in response to the steering operation of the steering wheel 3 performed by the driver. For example, the reaction force control unit 300 calculates a target steering reaction force (spring component) corresponding to a self-aligning torque applied to the wheel 2, based on the steering angle θs and the vehicle speed V. The target steering reaction force may further include a damping component according to a steering speed (dθs/dt). The reaction force control unit 300 controls the reaction force actuator 31 so as to generate the target steering reaction force. More specifically, the reaction force control unit 300 generates a control signal for driving the reaction force actuator 31 based on the target steering reaction force. The reaction force actuator 31 is driven according to the control signal, and thereby the steering reaction force is generated.

Moreover, the reaction force control unit 300 may execute the reaction force control according to a request from the driving assist control unit 400 described later. Furthermore, the reaction force control unit 300 may execute the reaction force control in conjunction (collaboration) with the driving assist control by the driving assist control unit 400. Details of the reaction force control performed in conjunction with the driving assist control will be described later.

4. Driving Assist Control

The driving assist control unit 400 executes "driving assist control" that assists driving of the vehicle 1. The driving assist control automatically controls travel of the vehicle 1 independently of a driving operation by the driver. In the present embodiment, the driving assist control related to steering will be considered in particular. Examples of such the driving assist control include automated driving control, risk avoidance control, lane keep assist control (LTA: Lane Tracing Assist), lane departure suppression control (LDA: Lane Departure Alert), and the like.

The automated driving control controls automated driving of the vehicle 1. More specifically, the driving assist control unit 400 generates a travel plan of the vehicle 1 based on the driving environment information ENV. Examples of the travel plan include keeping a current travel lane, making a lane change, making a right or left turn, avoiding an obstacle, and the like. Furthermore, the driving assist control unit 400 generates a target trajectory TRJ necessary for the vehicle 1 to travel in accordance with the travel plan, based on the driving environment information ENV. The target trajectory TRJ includes a target position and a target speed. Then, the driving assist control unit 400 performs vehicle travel control such that the vehicle 1 follows the target trajectory TRJ.

More specifically, the driving assist control unit 400 calculates a deviation (e.g., a lateral deviation, a yaw angle deviation, and a speed deviation) between the vehicle 1 and the target trajectory TRJ, and calculates a target control amount necessary for reducing the deviation. Examples of the target control amount include a target turn angle, a target yaw rate, a target speed, a target acceleration, a target deceleration, a target current, and the like. The driving assist control unit 400 performs the vehicle travel control according to the target control amount. The vehicle travel control includes turning control, acceleration control, and deceleration control. The turning control is performed through the turning control unit 200 described above. The acceleration control and the deceleration control are performed by controlling a driving device and a braking device (not shown) of the vehicle 1.

Figure 3:
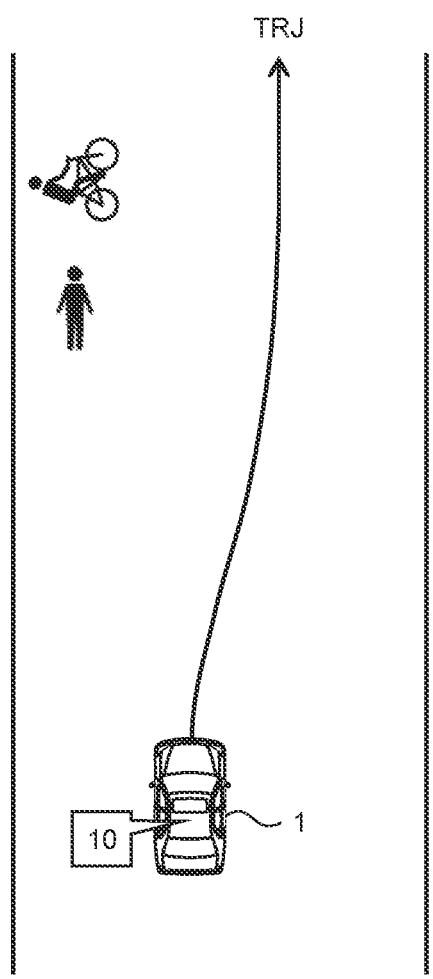
FIG. 3 is a conceptual diagram for explaining risk avoidance control being an example of driving assist control.

FIG. 3 is a conceptual diagram for explaining the risk avoidance control. The risk avoidance control is the driving assist control for reducing a risk of collision with an object existing ahead of the vehicle 1. Examples of the object as the avoidance target include a pedestrian, a bicycle, a motorcycle, an animal, another vehicle, and the like. The driving assist control unit 400 recognizes the object existing ahead of the vehicle 1 based on the surrounding situation information (object information) included in the driving environment information ENV. For example, when the risk of collision with the recognized object exceeds a threshold, the driving assist control unit 400 executes the risk avoidance control. More specifically, the driving assist control unit 400 generates a target trajectory TRJ moving in a direction away from the object in order to secure a lateral distance to the object. Then, the driving assist control unit 400 performs the vehicle travel control such that the vehicle 1 follows the target trajectory TRJ. The vehicle travel control here includes at least one of the turning control and the deceleration control. The turning control is performed through the turning control unit 200 described above.

Figure 4:
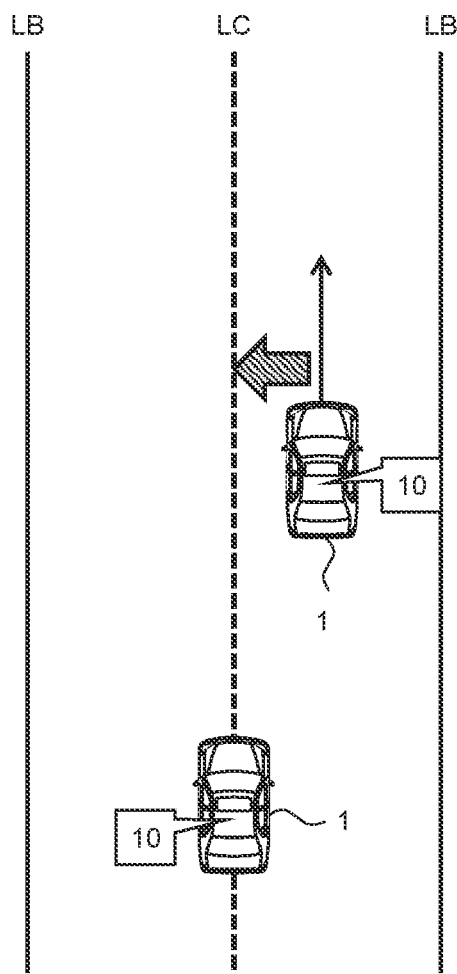
FIG. 4 is a conceptual diagram for explaining lane keep assist control being another example of driving assist control.

FIG. 4 is a conceptual diagram for explaining the lane keep assist control. The lane keep assist control is the driving assist control for assisting the vehicle 1 to travel along a lane center LC. The lane is an area sandwiched between left and right lane boundaries LB. Examples of the lane boundary LB include a white line (lane marking), a curb, and the like. The lane center LC is a center line of the lane. The driving assist control unit 400 recognizes the lane boundary LB and the lane center LC based on the surrounding situation information included in the driving environment information ENV. When the vehicle 1 deviates from the lane center LC, the driving assist control unit 400 executes the lane keep assist control. More specifically, the driving assist control unit 400 executes the turning control such that the vehicle 1 returns back to the lane center LC. The turning control is performed through the turning control unit 200 described above.

Figure 5:
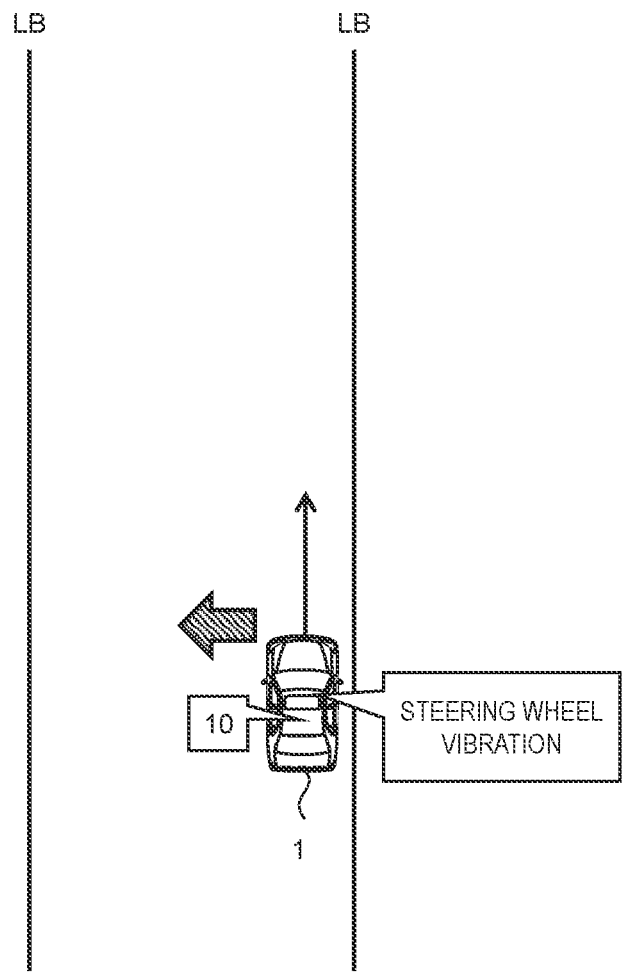
FIG. 5 is a conceptual diagram for explaining lane departure suppression control being yet another example of driving assist control.

FIG. 5 is a conceptual diagram for explaining the lane departure suppression control. The lane departure suppression control is the driving assist control for suppressing the vehicle 1 from departing from a travel lane. The driving assist control unit 400 recognizes the lane boundary LB based on the surrounding situation information included in the driving environment information ENV. When a distance between the vehicle 1 and the lane boundary LB becomes less than a predetermined threshold, the driving assist control unit 400 executes the lane departure suppression control. More specifically, the driving assist control unit 400 notifies the driver of a possibility of the lane departure. For example, the driving assist control unit 400 vibrates the steering wheel 3 by controlling a steering wheel vibration mechanism (not shown). The driving assist control unit 400 may output an alert through display and/or audio. Moreover, the driving assist control unit 400 may execute the turning control such that the vehicle 1 moves toward the lane center LC. The turning control is performed through the turning control unit 200 described above.

5. Cooperation of Driving Assist Control and Reaction Force Control

Next, cooperation of the driving assist control and the reaction force control will be considered. For example, a case where the reaction force control is performed in conjunction (collaboration) with turning of the vehicle 1 caused by the driving assist control will be considered. Such the reaction force control performed in conjunction with turning of the vehicle 1 caused by the driving assist control is hereinafter referred to as "conjunction reaction force control."

The conjunction reaction force control is intended to move (rotate) the steering wheel 3 in conjunction with the turning of the vehicle 1 (i.e., changing a direction of the wheel 2) caused by the driving assist control when the driving assist control is in operation. For that purpose, the conjunction reaction force control applies a steering reaction force component for making the steering wheel 3 follow the turning of the vehicle 1 caused by the driving assist control to the steering wheel 3. Due to the rotation of the steering wheel 3, the driver is able to know a direction of the vehicle turning intended by the driving assist control. That is, the conjunction reaction force control makes it possible to transmit (notify) the direction of the turning of the vehicle 1 caused by the driving assist control to the driver.

Hereinafter, the conjunction reaction force control according to the present embodiment will be described in more detail.

5-1. Feedback Reaction Force Control

Figure 6:
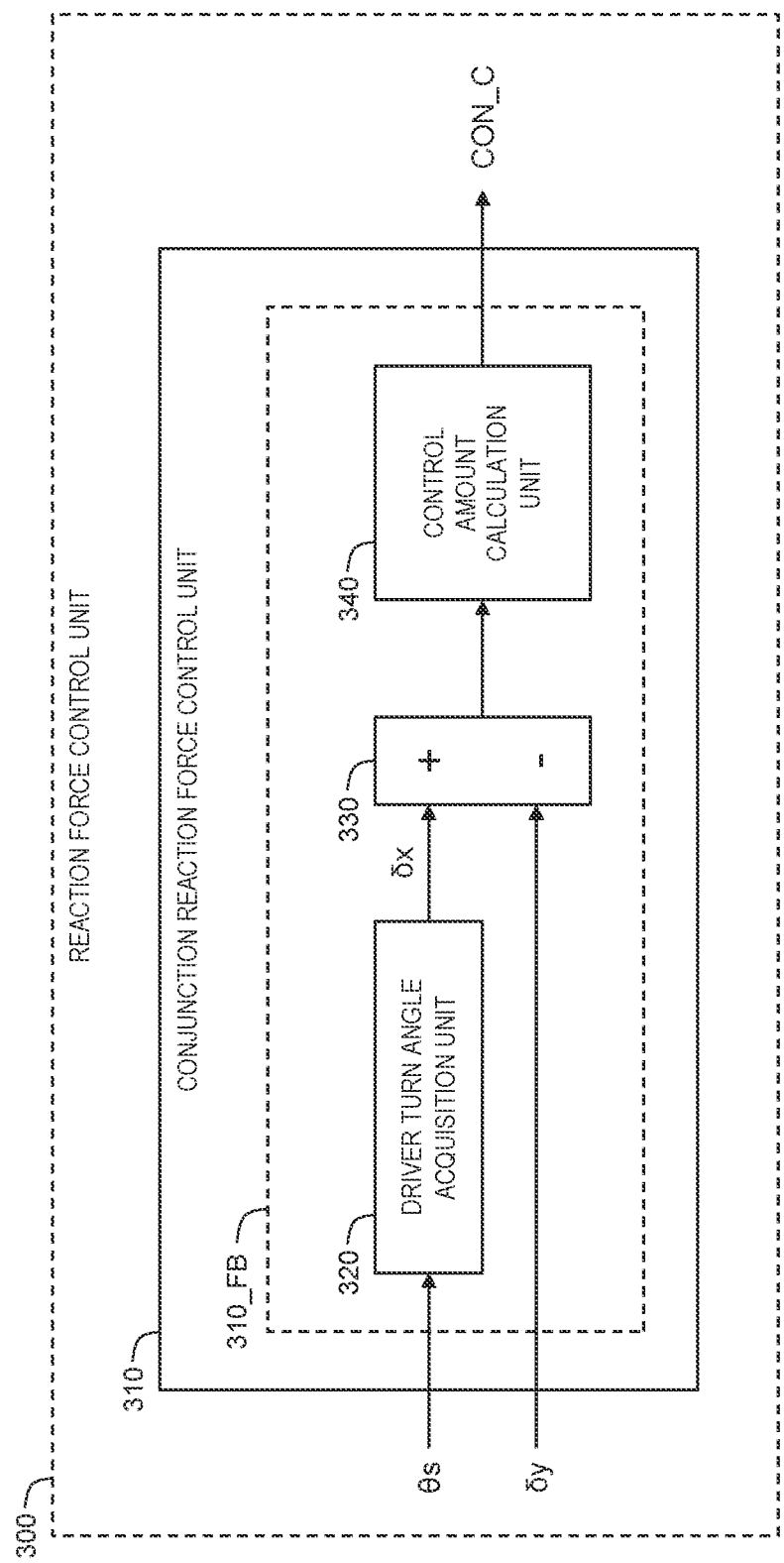
FIG. 6 is a block diagram for explaining an example of conjunction reaction force control according to an embodiment.

FIG. 6 is a block diagram for explaining an example of the conjunction reaction force control according to the present embodiment. The reaction force control unit 300 includes a conjunction reaction force control unit 310. The conjunction reaction force control unit 310 calculates a target control amount CON_C for generating the steering reaction force component for the conjunction reaction force control.

In the example shown in FIG. 6, the conjunction reaction force control unit 310 includes a feedback reaction force control unit 310_FB. The feedback reaction force control unit 310_FB includes a driver turn angle acquisition unit 320, a difference calculation unit 330, and a control amount calculation unit 340.

The driver turn angle acquisition unit 320 acquires the steering angle θs (i.e., the steering wheel angle) of the steering wheel 3 included in the vehicle state information. Further, the driver turn angle acquisition unit 320 calculates a target turn angle δt corresponding to the steering angle θs of the steering wheel 3 based on a variable gear ratio and the like. The calculation of the target turn angle δt is the same as that by the turning control unit 200 described above. For convenience sake, the target turn angle δt corresponding to the steering angle θs of the steering wheel 3 is hereinafter referred to as a "driver turn angle δx."

On the other hand, a "system turn angle δy" is a target turn angle δt required by the driving assist control. As described above, the system turn angle δy is determined by the driving assist control unit 400. The conjunction reaction force control unit 310 acquires the system turn angle δy determined by the driving assist control unit 400.

The difference calculation unit 330 calculates a difference (deviation) between the driver turn angle δx and the system turn angle δy.

The control amount calculation unit 340 calculates the target control amount CON_C for generating a steering reaction force component in a direction of reducing the difference between the driver turn angle δx and the system turn angle δy. For example, the control amount calculation unit 340 calculates the target control amount CON_C such that the steering reaction force component increases as the difference becomes larger.

It should be noted that the reaction force control unit 300 calculates a final target control amount by combining the target control amount CON_C caused by the conjunction reaction force control and another target control amount caused by another type of reaction force control. Then, the reaction force control unit 300 executes the reaction force control by controlling the reaction force actuator 31 of the reaction force device 30 in accordance with the final target control amount.

As described above, the conjunction reaction force control (the feedback reaction force control) shown in FIG. 6 applies the steering reaction force component for making the steering wheel 3 follow the turning of the vehicle 1 caused by the driving assist control to the steering wheel 3. Due to the rotation of the steering wheel 3, the driver is able to know a direction of the vehicle turning intended by the driving assist control.

However, there may be a situation where even when the driving assist control performs the turning of the vehicle 1, it is not reflected in the rotation of the steering wheel 3. As an example, let us consider a case where a change in the system turn angle δy required by the driving assist control is minute. When it is tried to rotate the steering wheel 3, a static frictional force acts on the steering shaft 4 coupled with the steering wheel 3. Such the static frictional force occurs, for example, due to parts such as gears in a steering column. When the change in the system turn angle δy is minute and thus the target control amount CON_C caused by the conjunction reaction force control is minute, there is a possibility that the steering reaction force applied to the steering wheel 3 does not exceed the static frictional force and thus the steering wheel 3 does not rotate. If a gain used for calculating the target control amount CON_C in the control amount calculation unit 340 is set to be high, steering of the steering wheel 3 by the driver having a steering intention causes a strong steering reaction force in a direction of hindering the driver's steering. Since the driver feels a feeling of strangeness about such the steering reaction force control hindering the driver' steering, there is a limit to the gain setting. Moreover, in the case of the vehicle 1 of the steer-by-wire type, the gear ratio is set to be quick and thus the steering angle θs of the steering wheel 3 tends to be smaller than the turn angle of the wheel 2. Therefore, when the change in the system turn angle δy is minute, the steering wheel 3 may not rotate even when the actual turn angle δa of the wheel 2 changes to follow the system turn angle δy. When only a vehicle behavior occurs without any rotation of the steering wheel 3, the driver may have a feeling of strangeness about lack of unity between the steering wheel 3 and the vehicle behavior.

In view of the above, the conjunction reaction force control according to the present embodiment may include "feedforward reaction force control" as described below.

5-2. Feedforward Reaction Force Control

Figure 7:
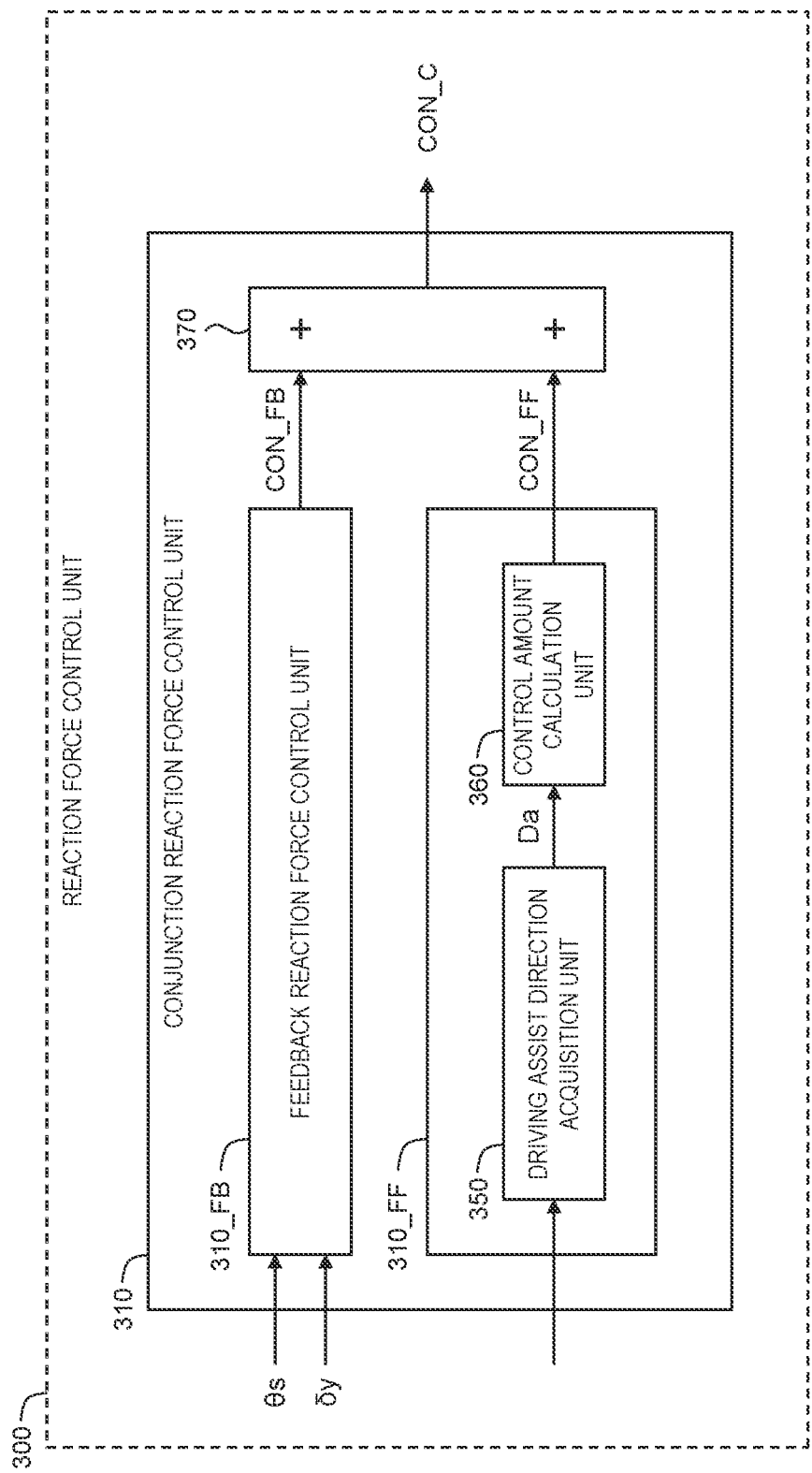
FIG. 7 is a block diagram for explaining another example of conjunction reaction force control according to an embodiment.

FIG. 7 is a block diagram for explaining another example of the conjunction reaction force control according to the present embodiment. The conjunction reaction force control unit 310 further includes a feedforward reaction force control unit 310_FF and an adder unit 370 in addition to the above-described feedback reaction force control unit 310_FB.

As described above, the feedback reaction force control unit 310_FB calculates the driver turn angle δx according to the steering angle θs of the steering wheel 3, and calculates the target control amount CON_C for the conjunction reaction force control based on the difference between the driver turn angle δx and the system turn angle δy. For convenience sake, the target control amount CON_C calculated by the feedback reaction force control unit 310_FB is hereinafter referred to as an "FB target control amount CON_FB."

On the other hand, the feedforward reaction force control unit 310_FF calculates a target control amount CON_C for the conjunction reaction force control without depending on the steering angle θs of the steering wheel 3. For convenience sake, the target control amount CON_C calculated by the feedforward reaction force control unit 310_FF is hereinafter referred to as an "FF target control amount CON_FF."

The adder unit 370 adds the FB target control amount CON_FB and the FF target control amount CON_FF to calculate the target control amount CON_C for the conjunction reaction force control.

More specifically, the feedforward reaction force control unit 310_FF includes a driving assist direction acquisition unit 350 and a control amount calculation unit 360.

The driving assist direction acquisition unit 350 performs a process of acquiring information on a driving assist direction Da. The driving assist direction Da is a direction of the turning of the vehicle 1 (the wheel 2) caused by the driving assist control. That is, the driving assist direction Da is a left direction or a right direction. The driving assist direction Da may be represented by a numerical value. For example, Da=1 represents one of the left direction and the right direction, and Da=−1 represents the other. Examples of the driving assist direction acquisition process by the driving assist direction acquisition unit 350 will be described later.

The control amount calculation unit 360 calculates the FF target control amount CON_FF based on the driving assist direction Da. More specifically, the control amount calculation unit 360 calculates the FF target control amount CON_FF for generating a steering reaction force component that moves (rotates) the steering wheel 3 in the same direction as the driving assist direction Da. Here, the steering reaction force component (absolute value) that moves the steering wheel 3 in the same direction as the driving assist direction Da is set to a value greater than the static frictional force acting on the steering shaft 4 coupled with the steering wheel 3. The static frictional force is grasped in advance through measurement or simulation. The steering reaction force component greater than the static frictional force may be a constant value.

As described above, the feedforward reaction force control unit 310_FF performs the feedforward reaction force control that moves (rotates) the steering wheel 3 in the same direction as the driving assist direction Da without depending on the steering angle θs of the steering wheel 3. The feedforward reaction force control makes it possible to effectively transmit (notify) the driving assist direction Da to the driver. Even when the change in the system turn angle δy required by the driving assist control is minute, it is easy to move the steering wheel 3 in the same direction as the driving assist direction Da. It is therefore possible to reduce the driver's feeling of strangeness.

5-3. Examples of Driving Assist Direction Acquisition Process

5-3-1. First Example

Figure 8:
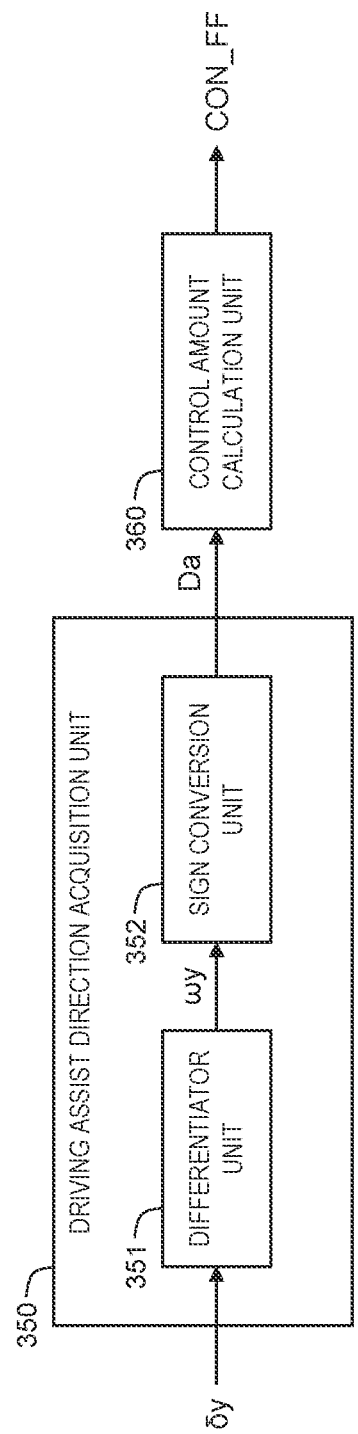
FIG. 8 is a block diagram showing a first example of a driving assist direction acquisition unit according to an embodiment.

FIG. 8 is a block diagram showing a first example of the driving assist direction acquisition unit 350. The driving assist direction acquisition unit 350 acquires the system turn angle δy from the driving assist control unit 400 and determines the driving assist direction Da based on the system turn angle δy. More specifically, the driving assist direction acquisition unit 350 includes a differentiator unit 351 and a sign conversion unit 352.

The differentiator unit 351 acquires the system turn angle δy and calculates a system turn angular velocity ωy by differentiating the system turn angle δy.

The sign conversion unit 352 outputs "+1" when the system turn angular velocity ωy is a positive value, and outputs "−1" when the system turn angular velocity ωy is a negative value. The output from the sign conversion unit 352 is used as the driving assist direction Da. Da=1 represents one of the left direction and the right direction, and Da=−1 represents the other.

The control amount calculation unit 360 calculates the FF target control amount CON_FF by multiplying the driving assist direction Da by a predetermined gain.

Figure 9:
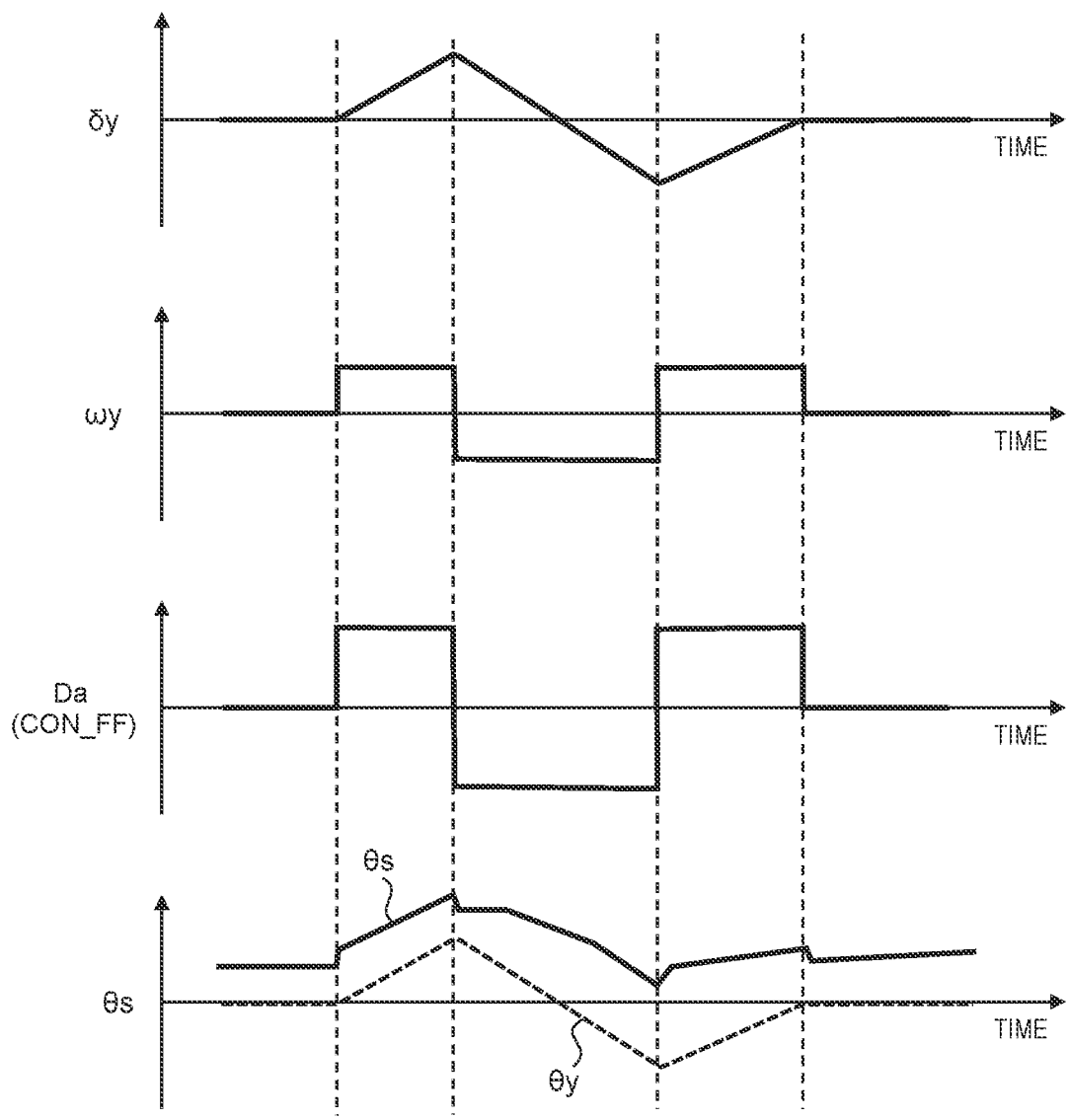
FIG. 9 is a timing chart for explaining an example of feedforward reaction force control of conjunction reaction force control according to an embodiment.

FIG. 9 is a timing chart for explaining an example of the feedforward reaction force control. In FIG. 9, respective time variations of the system turn angle δy, the system turn angular velocity ωy, the driving assist direction Da (or the FF target control amount CON_FF), the steering angle θs of the steering wheel 3, and a system steering angle θy. The system steering angle θy is a value obtained by converting the system turn angle δy to a steering angle. As shown in FIG. 9, the steering angle θs changes in a direction of the change in the system turn angle δy (the system steering angle θy). That is, the steering wheel 3 moves in the same direction as the driving assist direction Da. As a result, the driver is able to know the driving assist direction Da intended by the driving assist control.

It should be noted that in determining the driving assist direction Da, the system steering angle θy obtained by converting the system turn angle δy to the steering angle may be used instead of the system turn angle δy. Even in this case, the fact remains that the driving assist direction acquisition unit 350 determines the driving assist direction Da based on the system turn angle δy.

According to the first example, it is possible to quickly determine a change in the driving assist direction Da based on the system turn angle δy.

5-3-2. Second Example

Figure 10:
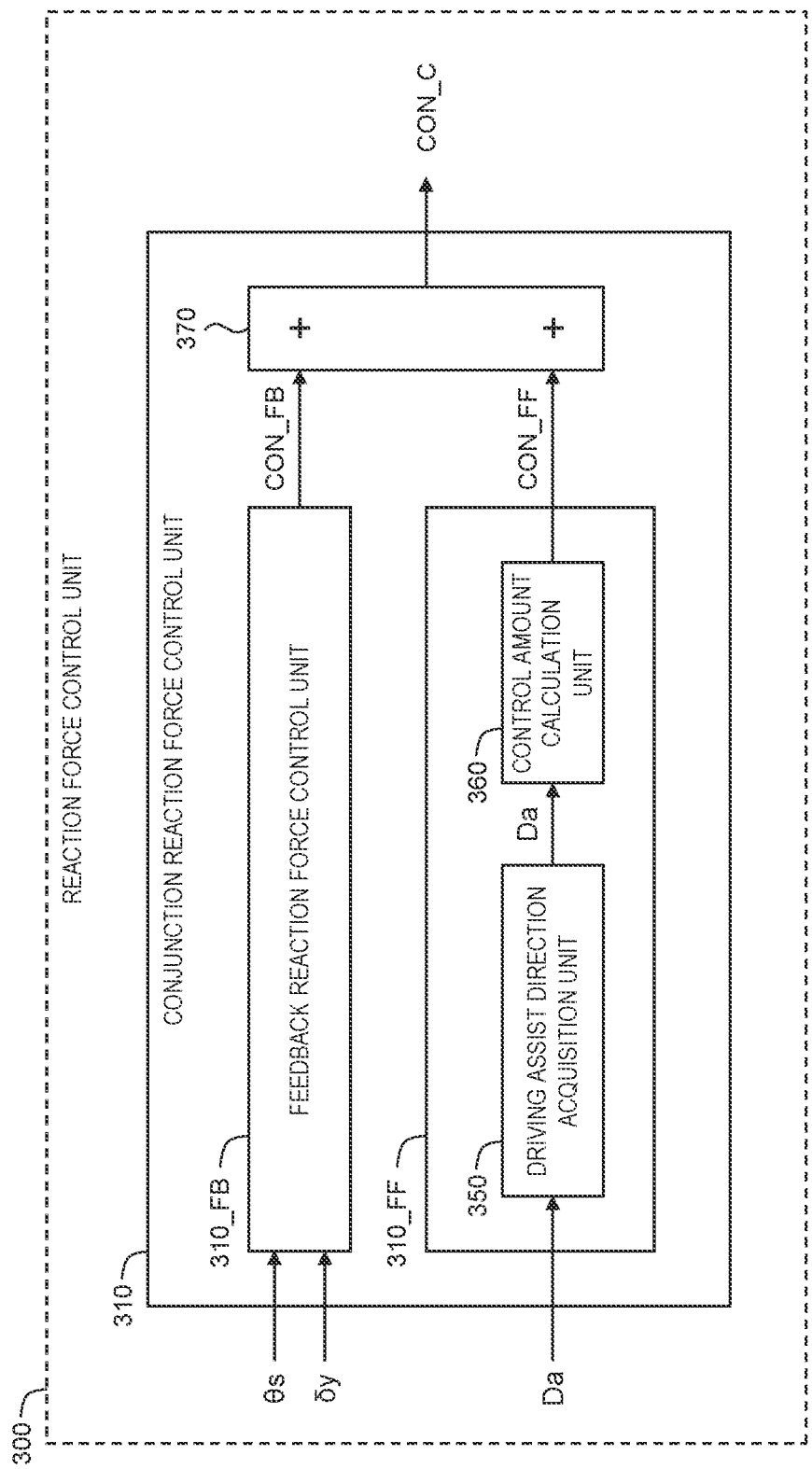
FIG. 10 is a block diagram showing a second example of a driving assist direction acquisition unit according to an embodiment.

FIG. 10 is a block diagram showing a second example of the driving assist direction acquisition unit 350. In the second example, the driving assist direction Da is notified from the driving assist control unit 400 to the driving assist direction acquisition unit 350. That is, the driving assist direction acquisition unit 350 directly acquires the information on the driving assist direction Da from the driving assist control unit 400. The driving assist control unit 400 is able to recognize the driving assist direction Da in the near future based on the target trajectory TRJ determined by itself (see FIG. 3).

5-4. Modification Examples

Figure 11:
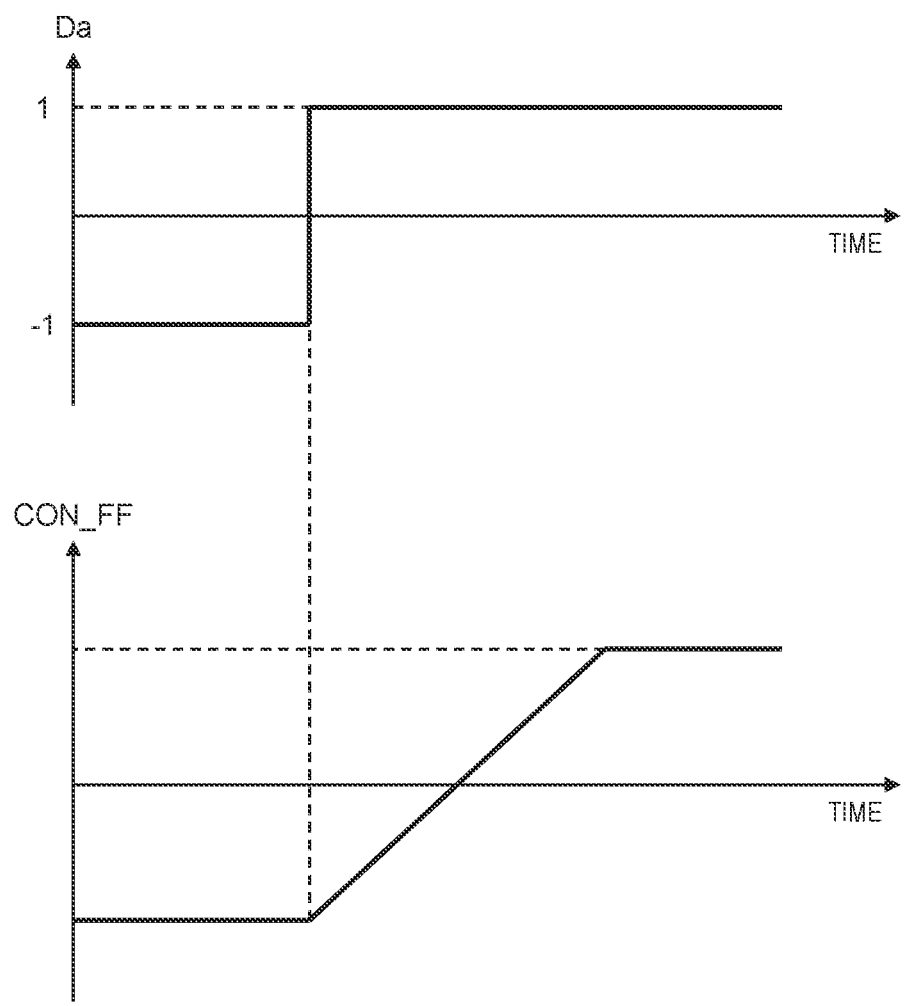
FIG. 11 is a conceptual diagram for explaining a modification example according to an embodiment.

As shown in FIG. 11, when the driving assist direction Da is changed, the control amount calculation unit 360 may gradually change the FF target control amount CON_FF. This makes it possible to prevent a rapid change in the steering reaction force when the driving assist direction Da is changed.

The conjunction reaction force control unit 310 may include only the feedforward reaction force control unit 310_FF without including the feedback reaction force control unit 310_FB.

5-5. Effects

As described above, according to the present embodiment, the conjunction reaction force control that applies the steering reaction force component to the steering wheel 3 in conjunction with the turning of the vehicle 1 caused by the driving assist control is performed. The conjunction reaction force control includes the feedforward reaction force control that moves (rotates) the steering wheel 3 in the same direction as the driving assist direction Da without depending on the steering angle θs of the steering wheel 3. The feedforward reaction force control makes it possible to effectively transmit (notify) the driving assist direction Da to the driver. Even when the change in the system turn angle δy required by the driving assist control is minute, it is easy to move the steering wheel 3 in the same direction as the driving assist direction Da. Due to the rotation of the steering wheel 3, the driver is able to know the driving assist direction Da, that is, the direction of the vehicle turning intended by the driving assist control. It is thus possible to reduce the driver's feeling of strangeness.

What is claimed is:

1. A vehicle control system that controls a vehicle of a steer-by-wire type,
the vehicle control system comprising one or more processors configured to execute:
driving assist control that assists driving of the vehicle; and
conjunction reaction force control that applies a steering reaction force component to a steering wheel in conjunction with turning of the vehicle caused by the driving assist control, wherein
a system turn angle is a target turn angle of the driving assist control,
a driving assist direction is a direction of the turning of the vehicle caused by the driving assist control, and
the conjunction reaction force control includes feedforward reaction force control that moves the steering wheel in a same direction as the driving assist direction without depending on a steering angle of the steering wheel and a magnitude of the system turn angle.

2. The vehicle control system according to claim 1, wherein
the feedforward reaction force control includes:
a driving assist direction acquisition process that acquires information on the driving assist direction; and
applying a steering reaction force component that moves the steering wheel in the same direction as the driving assist direction to the steering wheel.

3. The vehicle control system according to claim 2, wherein
the driving assist direction acquisition process includes:
acquiring the system turn angle; and
determining the driving assist direction based on the system turn angle.

4. The vehicle control system according to claim 3, wherein
the driving assist direction acquisition process further includes:
calculating a system turn angular velocity by differentiating the system turn angle; and
determining the driving assist direction based on the system turn angular velocity.

5. The vehicle control system according to claim 1, wherein
the steering reaction force component caused by the feedforward reaction force control is set to a value greater than a static frictional force acting on a steering shaft coupled with the steering wheel.

6. The vehicle control system according to claim 1, wherein
the conjunction reaction force control further includes feedback reaction force control,
the feedback reaction force control includes:
acquiring a driver turn angle that is a target turn angle corresponding to the steering angle of the steering wheel;
acquiring the system turn angle; and
applying a steering reaction force component to the steering wheel in a direction of reducing a difference between the driver turn angle and the system turn angle.

7. A vehicle control method that controls a vehicle of a steer-by-wire type,
the vehicle control method comprising:
driving assist control that assists driving of the vehicle; and
conjunction reaction force control that applies a steering reaction force component to a steering wheel in conjunction with turning of the vehicle caused by the driving assist control, wherein a system turn angle is a target turn angle of the driving assist control, a driving assist direction is a direction of the turning of the vehicle caused by the driving assist control, and the conjunction reaction force control includes feedforward reaction force control that moves the steering wheel in a same direction as the driving assist direction without depending on a steering angle of the steering wheel and a magnitude of the system turn angle.

8. The vehicle control system according to claim 1, wherein the driving assist direction is a first value or a second value, and wherein the first value corresponds to a left direction, and the second value corresponds to a right direction.

9. The vehicle control method according to claim 7, wherein the driving assist direction is a first value or a second value, wherein the first value corresponds to a left direction, and the second value corresponds to a right direction.

\* \* \* \* \*